(12) United States Patent
Shi et al.

(10) Patent No.: US 12,730,285 B2
(45) Date of Patent: Sep. 8, 2026

(54) LARGE-FIELD OF VIEW, HIGH-RESOLUTION BROADBAND OBJECTIVE LENS

(71) Applicant: SUZHOU INSTITUTE OF BIOMEDICAL ENGINEERING AND TECHNOLOGY, CHINESE ACADEMY OF SCIENCES, Suzhou (CN)

(72) Inventors: Guohua Shi, Suzhou (CN); Xin Xu, Suzhou (CN); Yi He, Suzhou (CN); Xin Zhang, Suzhou (CN); Jixiang Wang, Suzhou (CN)

(73) Assignee: Suzhou Institute of Biomedical Engineering and Technology, Chinese Academy of Sciences, Jiangsu (CN)

( * ) Notice: Subject to any disclaimer, the term of this patent is extended or adjusted under 35 U.S.C. 154(b) by 254 days.

(21) Appl. No.: 18/699,378

(22) PCT Filed: Nov. 10, 2021

(86) PCT No.: PCT/CN2021/129691
§ 371 (c)(1),
(2) Date: Apr. 8, 2024

(87) PCT Pub. No.: WO2023/056679
PCT Pub. Date: Apr. 13, 2023

(65) Prior Publication Data
US 2025/0237855 A1 Jul. 24, 2025

(30) Foreign Application Priority Data
Oct. 9, 2021 (CN) .......................... 202111177903.3

(51) Int. Cl.
*G02B 7/02* (2021.01)
*G02B 13/14* (2006.01)

(52) U.S. Cl.
CPC ........... *G02B 13/146* (2013.01); *G02B 7/025* (2013.01)

(58) Field of Classification Search
CPC .. G02B 13/146; G02B 7/025; G02B 13/0045; G02B 13/06; G02B 13/005; G02B 13/006; G02B 13/008; G02B 13/14; G02B 21/02
See application file for complete search history.

(56) References Cited

U.S. PATENT DOCUMENTS 4,206,973 A * 6/1980 Ikemori ................. G02B 13/04 359/749
2003/0043473 A1 3/2003 Okuyama
(Continued)

FOREIGN PATENT DOCUMENTS

CN 1639644 A 7/2005
CN 101965533 A 2/2011
(Continued)

OTHER PUBLICATIONS

Kingslake et al. “Lens Design Fundamentals” (Year: 2010).*
(Continued)

*Primary Examiner* — Bumsuk Won
*Assistant Examiner* — John C Sipes
(74) *Attorney, Agent, or Firm* — Miles & Stockbridge PC; Ajay A. Jagtiani

(57) ABSTRACT

A large-field of view, high-resolution broadband objective lens, which comprises nineteen spherical lenses that are arranged on the same optical axis. The nineteen lenses sequentially comprise, from an object side to an image side: a first lens, a second lens, a third lens, a fourth lens, a fifth lens, a sixth lens, a seventh lens, an eighth lens, a ninth lens, a tenth lens, an eleventh lens, a twelfth lens, a thirteenth lens, a fourteenth lens, a fifteenth lens, a sixteenth lens, a seven-
(Continued)

teenth lens, an eighteenth lens and a nineteenth lens. Compared with previous similar objective lenses, the objective lens has a higher resolution, a larger imaging field of view and a wider working waveband, and can meet the requirement for visible light and near-infrared two-photon, large-field of view, high-resolution imaging.

6 Claims, 4 Drawing Sheets

(56) References Cited

U.S. PATENT DOCUMENTS

2003/0174408 A1 9/2003 Rostalski et al.
2012/0069440 A1 3/2012 Harada
2014/0240849 A1* 8/2014 Toyama ......... G02B 15/144109 359/688
2016/0116724 A1* 4/2016 Abe ....................... G02B 21/33 359/656
2016/0282592 A1 9/2016 Abe et al.
2016/0341934 A1* 11/2016 Mercado ............ G02B 13/0045
2016/0363745 A1* 12/2016 Kubota ................ G03B 21/208
2017/0038567 A1* 2/2017 Wang ............. G02B 15/144113
2020/0064614 A1 2/2020 Arashi
2020/0192060 A1* 6/2020 Sawamoto ............. G02B 13/24
2020/0310256 A1* 10/2020 An ......................... G02B 13/14
2020/0319434 A1* 10/2020 Imaoka .................. G02B 15/15
2021/0132345 A1* 5/2021 Nishioka ............ G02B 15/1461
2022/0075159 A1* 3/2022 Guo .................... G03F 7/70308

FOREIGN PATENT DOCUMENTS

CN 102540419 A 7/2012
CN 102971656 A 3/2013
CN 108873288 A 11/2018
CN 109061861 A 12/2018
CN 109633883 A 4/2019
CN 111158129 A 5/2020
CN 111381346 A 7/2020
CN 112394474 A 2/2021
CN 113093480 A 7/2021
CN 113366360 A 9/2021
JP H06-160721 A 6/1994
JP H08-286112 A 11/1996
JP 2003-167199 A 6/2003
JP 2010-060920 A 3/2010
JP 2013007957 A 1/2013
TW 200730867 A 8/2007
WO 2015107881 A1 7/2015

OTHER PUBLICATIONS

Supplementary Search Report dated May 12, 2022 of corresponding CN patent application No. 202111177903.3.
International Search Report and Written Opinion of the International Search Authority mailed Apr. 28, 2022 for PCT Patent application No. PCT/CN2021/129691.
First Office Action dated Apr. 24, 2022 for Chinese patent application No. 202111177903.3.
International Search Report and Written Opinion mailed Apr. 28, 2022 in International Patent Application: PCT/CN2021/129691.
McConnell, G. et al., "A Novel Optical Microscope for Imaging Large Embryos and Tissue Volumes with Sub-Cellular Resolution Throughout," eLife 2016;5:e18659, pp. 1-15.
Stirman, J.N. et al., "Wide Field-of-View, Multi-Region, Two-Photon Imaging of Neuronal Activity in the Mammalian Brain," Nature Biotechnology, 34(8); Aug. 2016, pp. 857-862.

* cited by examiner

LARGE-FIELD OF VIEW, HIGH-RESOLUTION BROADBAND OBJECTIVE LENS

TECHNICAL FIELD

The present application belongs to the technical field of optics, in particular to a large-field of view, high-resolution broadband objective lens.

BACKGROUND

A microscope objective lens, as a key device of a microscope, images a sample at a specific field of view, focal length and numerical aperture (NA) to an image plane for observation or detection. Bound by the principle of optical imaging, the field of view and resolution of an objective lens are mutually constrained. The numerical aperture of an objective lens determines the resolution thereof. Usually, the effective imaging field of view of an objective lens having an NA of 0.5 is about 1 mm. For imaging of some large samples, field-of-view stitching is often used, which has low imaging throughput and slow imaging speed. For example, it may take tens of days to image the whole brain slices of a mouse at high resolution. To solve this problem, in 2016, researchers from University of Strathclyde in UK proposed an objective lens (Mesolens) with a large field of view and a high resolution, which is of a 15-lens structure, has an NA of 0.47 and an object-side field of view of 6 mm, and works within the waveband of 400-700 nm [Reference: McConnell, G. et al. eLife 5, e18659 (2016).]. In the field of biological imaging, in addition to visible light illumination, two-photon imaging is commonly used to improve the imaging depth and imaging quality, and the required working waveband is 800-1000 nm, so Mesolens fails to meet the demand. In 2016, researchers from University of North Carolina in U.S. proposed an objective lens with a large field of view and a high resolution, which is of a 9-lens structure, has an NA of 0.43 and an object-side field of view of 3.5 mm, and operates within the waveband of 910±10 nm [Reference: J. N. Stirman, et al. Nat Biotechnol 34(8), 857-862 (2016).]. The objective lens has a simple structure and can be used for two-photon imaging, but its operating band of only 30 nm is quite limited. Thus, the objective lens can only be used for fluorescence imaging of a small number of specific markers, and its range of application scenarios is relatively narrow. Chinese patent CN108873288 provided an objective lens structure having a high numerical aperture and a large field of view. The objective Jens has an NA of greater than or equal to 0.75 and less than or equal to 1. It can be seen from FIGS. 7 and 9 of the patent that the typical field of view of the objective lens is 2.2 mm, which is obviously increased compared with that of a conventional objective lens. However, its field of view is still small and can hardly meet the requirement for imaging of large-scale samples, and its working waveband is 500-800 nm, which does not cover the common band for two-photon imaging.

SUMMARY OF THE INVENTION

The aim of the present application is to provide, in view of the above problems in the prior art, a large-field of view, high-resolution broadband objective lens.

The technical solution for achieving the aim of the present application is as follows: a large-field of view, high-resolution broadband objective lens, wherein the objective lens comprises nineteen spherical lenses that are arranged on the same optical axis, and the nineteen lenses sequentially comprise, from an object side to an image side, a first lens, a second lens, a third lens, a fourth lens, a fifth lens, a sixth lens, a seventh lens, an eighth lens, a ninth lens, a tenth lens, an eleventh lens, a twelfth lens, a thirteenth lens, a fourteenth lens, a fifteenth lens, a sixteenth lens, a seventeenth lens, an eighteenth lens and a nineteenth lens, wherein, the first lens and the second lens are combined to form a cemented lens, wherein the surface of the first lens facing the object side is a concave surface and the surface thereof facing the image side is a concave surface, the surface of the second lens facing the object side is a convex surface and the surface thereof facing the image side is a convex surface, and the concave surface of the first lens facing the image side and the convex surface of the second lens facing the object side are cemented together;

the third lens, the fourth lens and the fifth lens are combined to form a cemented lens, wherein the surface of the third lens facing the object side is a concave surface and the surface thereof facing the image side is a convex surface, the surface of the fourth lens facing the object side is a concave surface and the surface thereof facing the image side is a planar surface, the surface of the fifth lens facing the object side is a planar surface and the surface thereof facing the image side is a convex surface, the convex surface of the third lens facing the image side and the concave surface of the fourth lens facing the object side are cemented together, and the planar surface of the fourth lens facing the image side and the planar surface of the fifth lens facing the object side are cemented together;

the surface of the sixth lens facing the object side is a convex surface and the surface thereof facing the image side is a convex surface;

the seventh lens and the eighth lens are combined to form a cemented lens, wherein the surface of the seventh lens facing the object side is a convex surface and the surface thereof facing the image side is a concave surface, the surface of the eighth lens facing the object side is a convex surface and the surface thereof facing the image side is a convex surface, and the concave surface of the seventh lens facing the image side and the convex surface of the eighth lens facing the object side are cemented together, the ninth lens, the tenth lens and the eleventh lens are combined to form a cemented lens, wherein the surface of the ninth lens facing the object side is a convex surface and the surface thereof facing the image side is a planar surface, the surface of the tenth lens facing the object side is a planar surface and the surface thereof facing the image side is a concave surface, the surface of the eleventh lens facing the object side is a convex surface and the surface thereof facing the image side is a convex surface, the planar surface of the ninth lens facing the image side and the planar surface of the tenth lens facing the object side are cemented together, and the concave surface of the tenth lens facing the image side and the convex surface of the eleventh lens facing the object side are cemented together;

the twelfth lens and the thirteenth lens are combined to form a cemented lens, wherein the surface of the twelfth lens facing the object side is a convex surface and the surface thereof facing the image side is a concave surface, the surface of the thirteenth lens facing the object side is a convex surface and the surface thereof facing the image side is a concave surface, and the concave surface of the twelfth lens facing the image side and the convex surface of the thirteenth lens facing the object side are cemented together;

the fourteenth lens and the fifteenth lens are combined to form a cemented lens, wherein the surface of the fourteenth lens facing the object side is a concave surface and the surface thereof facing the image side is a concave surface, the surface of the fifteenth lens facing the object side is a convex surface and the surface thereof facing the image side is a convex surface, and the concave surface of the fourteenth lens facing the image side and the convex surface of the fifteenth lens facing the object side are cemented together;

the surface of the sixth lens facing the object side is a concave surface and the surface thereof facing the image side is a convex surface;

the seventeenth lens and the eighteenth lens are combined to form a cemented lens, wherein the surface of the seventeenth lens facing the object side is a convex surface and the surface thereof facing the image side is a convex surface, the surface of the eighteenth lens facing the object side is a concave surface and the surface thereof facing the image side is a concave surface, and the convex surface of the seventeenth lens facing the image side and the concave surface of the eighteenth lens facing the object side are cemented together; and the surface of the nineteenth lens facing the object side is a convex surface and the surface thereof facing the image side is a convex surface.

Further, the concave surface of the first lens facing the object side is a first lens surface, the surface where the first lens and the second lens are cemented together is a second lens surface, the convex surface of the second lens facing the image side is a third lens surface, the concave surface of the third lens facing the object side is a fourth lens surface, the surface where the third lens and the fourth lens are cemented together is a fifth lens surface, the surface where the fourth lens and the fifth lens are cemented together is a sixth lens surface, the convex surface of the fifth lens facing the object side is a seventh lens surface, the convex surface of the sixth lens facing the object side is an eighth lens surface, the convex surface of the sixth lens facing the image side is a ninth lens surface, the convex surface of the seventh lens facing the object side is a tenth lens surface, the surface where the seventh lens and the eighth lens are cemented together is an eleventh lens surface, the convex surface of the eighth lens facing the image side is a twelfth lens surface, the convex surface of the ninth lens facing the object side is a thirteenth lens surface, the surface where the ninth lens and the tenth lens are cemented together is a fourteenth lens surface, the surface where the tenth lens and the eleventh lens are cemented together is a fifteenth lens surface, the convex surface of the eleventh lens facing the image side is a sixteenth lens surface, the convex surface of the twelfth lens facing the image side is a seventeenth lens surface, the surface where the twelfth lens and the thirteenth lens are cemented together is an eighteenth lens surface, the concave surface of the thirteenth lens facing the image side is a nineteenth lens surface, the concave surface of the fourteenth lens facing the object side is a twentieth lens surface, the surface where the fourteenth lens and the fifteenth lens are cemented together is a twenty-first lens surface, the convex surface of the fifteenth lens facing the image side is a twenty-second lens surface, the concave surface of the sixteenth lens facing the object side is a twenty-third lens surface, the convex surface of the sixteenth lens facing the image side is a twenty-fourth lens surface, the convex surface of the seventeenth lens facing the object side is a twenty-fifth lens surface, the surface where the seventeenth lens and the eighteenth lens are cemented together is a twenty-sixth lens surface, the concave surface of the eighteenth lens facing the image side is a twenty-seventh lens surface, the convex surface of the nineteenth lens facing the object side is a twenty-eighth lens surface, and the convex surface of the nineteenth lens facing the image side is a twenty-ninth lens surface.

Further, the parameters of the twenty-first lens surface comprise R1=−10.834 to −10.098 mm, D1=6.673 to 6.921 mm, and ϕ1=12.145 to 13.514 mm, where R1 is the radius of curvature of the twenty-first lens surface, D1 is the lens surface distance of the twenty-first lens surface, and ϕ1 is the effective clear aperture of the twenty-first lens surface;

the parameters of the second lens surface comprise R2=44.389 to 46.237 mm, D2=15.786 to 16 234 mm, ϕ2=23.597 to 24.415 mm, where R2 is the radius of curvature of the second lens surface, D2 is the lens surface distance of the second lens surface, and ϕ2 is the effective clear aperture of the second lens surface;

the parameters of the third lens surface comprise R3=−31.457 to −29.467 mm, D3=0.125 to 0.231 mm, and ϕ3=33.856 to 34.915 mm, where R3 is the radius of curvature of the third lens surface, D3 is the lens surface distance of the third lens surface, and ϕ3 is the effective clear aperture of the third lens surface;

the parameters of the fourth lens surface comprise R4=−118.657 to −114.324 mm, D4=9.324 to 9.639 mm, and ϕ4=38.467 to 40.125 mm, where R4 is the radius of curvature of the fourth lens surface, D4 is the lens surface distance of the fourth lens surface, and ϕ4 is the effective clear aperture of the fourth lens surface;

the parameters of the fifth lens surface comprise R5=−37.541 to −34.654 mm, D5=6.042 to 6.203 mm, ϕ5=41.921 to 43.015 mm, where R5 is the radius of curvature of the fifth lens surface, D5 is the lens surface distance of the fifth lens surface, and ϕ5 is the effective clear aperture of the fifth lens surface;

the parameters of the sixth lens surface comprise R6=0, D6=13.658 to 14.132 mm, ϕ6=49.687 to 51.032 mm, where R6 is the radius of curvature of the sixth lens surface, D6 is the lens surface distance of the sixth lens surface, and ϕ6 is the effective clear aperture of the sixth lens surface;

the parameters of the seventh lens surface comprise R7=−67.671 to −64.321 mm, D7=7.825 to 8.214 mm, and ϕ7=54.598 to 55.127 mm, where R7 is the radius of curvature of the seventh lens surface, D7 is the lens surface distance of the seventh lens surface, and ϕ7 is the effective clear aperture of the seventh lens surface;

the parameters of the eighth lens surface comprise R8=124.982 to 130.475 mm, D8=24.658 to 25.479 mm, and ϕ8=63.985 to 64.125 mm, where R8 is the radius of curvature of the eighth lens surface, D8 is the lens surface distance of the eighth lens surface, and ϕ8 is the effective clear aperture of the eighth lens surface;

the parameters of the ninth lens surface comprise R9=−75.984 to −73.411 mm, D9=0.265 to 0.478 mm, and ϕ9=64.934 to 65.984 mm, where R9 is the radius of curvature of the ninth lens surface, D9 is the lens surface distance of the ninth lens surface, and ϕ9 is the effective clear aperture of the ninth lens surface;

the parameters of the tenth lens surface comprise R10=308.458 to 315.541 mm, D10=6.475 to 6.632 mm, and ϕ10=62.798 to 63.327 mm, where R10 is the radius of curvature of the tenth lens surface, D10 is the lens surface distance of the tenth lens surface, and ϕ10 is the effective clear aperture of the tenth lens surface;

the parameters of the eleventh lens surface comprise R11=38.645 to 44.654 mm, D11=18.764 to 19.241 mm, and ϕ11=59 024 to 60.147 mm, where R11 is the radius of curvature of the eleventh lens surface, D11 is the lens surface distance of the eleventh lens surface, and ϕ11 is the effective clear aperture of the eleventh lens surface, the parameters of the twelfth lens surface comprise R12=−328.455 to −317.951 mm, D12=3.074 to 4.021 mm, ϕ12=59.312 to 60.147 mm, where R12 is the radius of curvature of the twelfth lens surface, D12 is the lens surface distance of the twelfth lens surface, and ϕ12 is the effective clear aperture of the twelfth lens surface;

the parameters of the thirteenth lens surface comprise R13=43.217 to 46.398 mm, D13=15.846 to 16.352 mm, and ϕ13=58.498 to 59.214 mm, where R13 is the radius of curvature of the thirteenth lens surface, D13 is the lens surface distance of the thirteenth lens surface, and ϕ13 is the effective clear aperture of the thirteenth lens surface;

the parameters of the fourteenth lens surface comprise R14=0, D14=6.045 to 6.134 mm, and ϕ14=56.413 to 57.041 mm, where R14 is the radius of curvature of the fourteenth lens surface, D14 is the lens surface distance of the fourteenth lens surface, and ϕ14 is the effective clear aperture of the fourteenth lens surface;

the parameters of the fifteenth lens surface comprise R15=41.657 to 48.691 mm, D15=15.231 to 16.098 mm, and ϕ15=49.547 to 50.412 mm, where R15 is the radius of curvature of the fifteenth lens surface, D15 is the lens surface distance of the fifteenth lens surface, and ϕ15 is the effective clear aperture of the fifteenth lens surface;

the parameters of the sixteenth lens surface comprise R16=−163.485 to −158.547 mm, D16=3.987 to 4.021 mm, and ϕ16=49.134 to 50.145 mm, where R16 is the radius of curvature of the sixteenth lens surface, D16 is the lens surface distance of the sixteenth lens surface, and ϕ16 is the effective clear aperture of the sixteenth lens surface;

the parameters of the seventeenth lens surface comprise R17=38.468 to 44.651 mm, D17=10.046 to 10.541 mm, and ϕ17=40.165 to 40.941 mm, where R17 is the radius of curvature of the seventeenth lens surface, D17 is the lens surface distance of the seventeenth lens surface, and ϕ17 is the effective clear aperture of the seventeenth lens surface;

the parameters of the eighteenth lens surface comprise R18=60.134 to 71.347 mm, D18=3.647 to 4.067 mm, and ϕ18=35.145 to 35.654 mm, where R18 is the radius of curvature of the eighteenth lens surface, D18 is the lens surface distance of the eighteenth lens surface, and ϕ18 is the effective clear aperture of the eighteenth lens surface;

the parameters of the nineteenth lens surface comprise R19=26.547 to 32.541 mm, D19=18.034 to 19.654 mm, and ϕ19=29.132 to 29.984 mm, where R19 is the radius of curvature of the nineteenth lens surface, D19 is the lens surface distance of the nineteenth lens surface, and ϕ19 is the effective clear aperture of the nineteenth lens surface;

the parameters of the twentieth lens surface comprise R20=−29.451 to −32.475 mm, D20=2.458 to 4.425 mm, and ϕ20=26.123 to 26.841 mm, where R20 is the radius of curvature of the twentieth lens surface, D20 is the lens surface distance of the twentieth lens surface, and ϕ20 is the effective clear aperture of the twentieth lens surface;

the parameters of the twenty-first lens surface comprise R21=45.374 to 49.324 mm, D21=22.348 to 25.487 mm, and ϕ21=30.546 to 30.987 mm, where R21 is the radius of curvature of the twenty-first lens surface, D21 is the lens surface distance of the twenty-first lens surface, and ϕ21 is the effective clear aperture of the twenty-first lens surface;

the parameters of the twenty-second lens surface comprise R22=−75.341 to −66.874 mm, D22=26.784 to 29.541 mm, ϕ22=40.568 to 41.025 mm, where R22 is the radius of curvature of the twenty-second lens surface, D22 is the lens surface distance of the twenty-second lens surface, and ϕ22 is the effective clear aperture of the twenty-second lens surface;

the parameters of the twenty-third lens surface comprise R23=−592.657 to −554.654 mm, D23=9.849 to 10.244 mm, and ϕ23=56.154 to 56.987 mm, where R23 is the radius of curvature of the twenty-third lens surface, D23 is the lens surface distance of the twenty-third lens surface, and ϕ23 is the effective clear aperture of the twenty-third lens surface, the parameters of the twenty-fourth lens surface comprise R24=−89.354 to −85.214 mm, D24=0.178 to 0.211 mm, and ϕ24=58 324 to 59.016, where R24 is the radius of curvature of the twenty-fourth lens surface, D24 is the lens surface distance of the twenty-fourth lens surface, and ϕ24 is the effective clear aperture of the twenty-fourth lens surface;

the parameters of the twenty-fifth lens surface comprise R25=244.534 to 251.541 mm, D25=9.047 to 10.231 mm, and ϕ25=58.314 to 59.154 mm, where R25 is the radius of curvature of the twenty-fifth lens surface, D25 is the lens surface distance of the twenty-fifth lens surface, and ϕ25 is the effective clear aperture of the twenty-fifth lens surface;

the parameters of the twenty-sixth lens surface comprise R26=−141.354 to −136.214 mm, D26=9.475 to 11.347 mm, and ϕ26=57.987 to 59.015 mm, where R26 is the radius of curvature of the twenty-sixth lens surface, D26 is the lens surface distance of the twenty-sixth lens surface, and ϕ26 is the effective clear aperture of the twenty-sixth lens surface;

the parameters of the twenty-seventh lens surface comprise R27=84.394 to 87.398 mm, D27=44.674 to 50.379 mm, and ϕ27=56.124 to 57.621 mm, where R27 is the radius of curvature of the twenty-seventh lens surface, D27 is the lens surface distance of the twenty-seventh lens surface, and ϕ27 is the effective clear aperture of the twenty-seventh lens surface;

the parameters of the twenty-eighth lens surface comprise R28=132.437 to 136.124 mm, D28=10.754 to 11.314 mm, and ϕ28=65.564 to 66.314 mm, where R28 is the radius of curvature of the twenty-eighth lens surface, D28 is the lens surface distance of the twenty-eighth lens surface, and ϕ28 is the effective clear aperture of the twenty-eighth lens surface; and the parameters of the twenty-ninth lens surface comprise R29=−326.154 to −317.645 mm, D29=123.457 to 134.637 mm, and ϕ29=65.324 to 66.654 mm, where R29 is the radius of curvature of the twenty-ninth lens surface, D29 is the lens surface distance of the twenty-ninth lens surface, and ϕ29 is the effective clear aperture of the twenty-ninth lens surface.

Further, the cemented lens formed by the first lens and the second lens has a focal length of −29.522 mm, the cemented lens formed by the third lens, the fourth lens and the fifth lens has a focal length of 127.315 mm, the sixth lens has a focal length of 94.234 mm, the cemented lens formed by the seventh lens and the eighth lens has a focal length of −570.237 mm, the cemented lens formed by the ninth lens, the tenth lens and the eleventh lens has a focal length of 121.547 mm, the cemented lens formed by the twelfth lens and the thirteenth lens has a focal length of −226.157 mm, the cemented lens formed by the fourteenth lens and the fifteenth lens has a focal length of −51.524 mm, the sixteenth lens has a focal length of 101.647 mm, the cemented lens formed by the seventeenth lens and the eighteenth lens has a focal length of −437.35 mm, and the nineteenth lens has a focal length of 149.951 mm.

Further, the first lens has a refractive index/Abbe number of 1.85/30.06, the second lens has a refractive index/Abbe number of 1.693/49.2, the third lens has a refractive index/Abbe number of 1.922/20.882, the fourth lens has a refractive index/Abbe number of 1.816/46.5, the fifth lens has a refractive index/Abbe number of 1.804/46.56, the sixth lens has a refractive index/Abbe number of 1.5/66.05, the seventh lens has a refractive index/Abbe number of 1.64/60.21, the eighth lens has a refractive index/Abbe number of 1.438/94.94, the ninth lens has a refractive index/Abbe number of 1.438/94.94, the tenth lens has a refractive index/Abbe number of 1.755/27.54, the eleventh lens has a refractive index/Abbe number of 1.5/66.05, the twelfth lens has a refractive index/Abbe number of 1.804/46.56, the thirteenth lens has a refractive index/Abbe number of 1.784/25.72, the fourteenth lens has a refractive index/Abbe number of 1.816/46 56, the fifteenth lens has a refractive index/Abbe number of 1.693/49.23, the sixteenth lens has a refractive index/Abbe number of 1.755/27.54, the seventeenth lens has a refractive index/Abbe number of 1.497/81.59, the eighteenth lens has a refractive index/Abbe number of 1.49 7/81.59, and the nineteenth lens has a refractive index/Abbe number of 1.64/60.214.

Further, the objective lens satisfies: $0.5 \leq NA < 0.7$, NA denoting the numerical aperture of the objective lens.

Further, the objective lens satisfies: 6 mm≤FOV<10 mm, the FOV denoting the object-side effective field of view of the objective lens.

Further, the objective lens satisfies: 400 nm≤Wavelength<1000 nm, the Wavelength denoting the effective working wavelength of the objective lens.

Further, the objective lens satisfies: $2\times10^8 \leq SBP < 1.08\times10^9$, where the SBP denotes the imaging throughput of the objective lens, $SBP=2\times(FOV/r_{xy})^2$, and the $r_{xy}$ denotes the lateral resolution of the objective lens.

Compared with the prior art, the present application has obvious advantages: 1) the objective lens has a super-large effective field of view while having a high numerical aperture, which significantly improves the imaging throughput and is beneficial to the high-resolution imaging of large-scale samples (the imaging throughputs of the three objective lenses in the background art are respectively $1.88\times10^8$, $1.02\times10^8$ and $1.1\times10^8$, which are less than or equal to SBP, which is less than $1.47\times10^8$). 2) The working waveband covers visible light and near infrared bands, such that the objective lens can be used for multispectral excited single-photon fluorescence imaging and two-photon fluorescence imaging and has applications in a wide range of scenarios.

The present application will be described hereinafter in further detail in connection with the accompanying drawings.

DETAILED DESCRIPTION

To make the objectives, technical solutions and advantages of the present application clearer, the present application will be described hereinafter in further detail with reference to the accompanying drawings and embodiments. It should be understood that the specific embodiments described herein are for the purpose of explaining the present application only, and are not intended to be limiting.

It should be noted that, if there are descriptions involving "first", "second" and so on in the embodiments of the present application, the descriptions involving the "first", "second", and so on are for descriptive purposes only and cannot be understood as indicating or implying their relative importance or implicitly indicating the number of technical features indicated. Thus, a feature defined as "first" and "second" may explicitly or implicitly include at least one of that feature. In addition, the technical solutions in the various embodiments may be combined with each other, but it must be based on the realization by a person of ordinary skill in the art. When the combination of technical solutions is contradictory or cannot be realized, it should be considered that the combination of technical solutions does not exist and is not within the scope of protection required by the present application.

Figure 1:
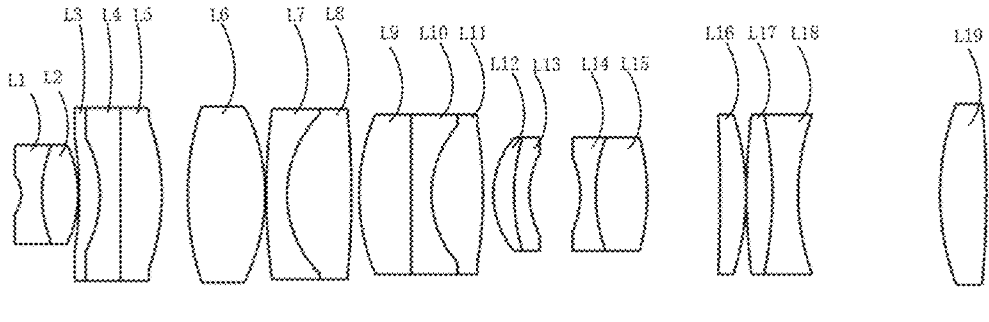
FIG. 1 is a schematic diagram of the structure of an objective lens in one embodiment.

In one embodiment, with reference to FIG. 1, a large-field of view, high-resolution broadband objective lens is provided, wherein the objective lens comprises nineteen spherical lenses that are arranged on the same optical axis, and the nineteen lenses sequentially comprise, from an object side to an image side, a first lens L1, a second lens L2, a third lens L3, a fourth lens L4, a fifth lens L5, a sixth lens L6, a seventh lens L7, an eighth lens L8, a ninth lens L9, a tenth lens L10, an eleventh lens L11, a twelfth lens L12, a thirteenth lens L13, a fourteenth lens L14, a fifteenth lens L15, a sixteenth lens L16, a seventeenth lens L17, an eighteenth lens L18 and a nineteenth lens L19, wherein, the first lens L1 and the second lens L2 are combined to form a cemented lens, wherein the surface of the first lens L1 facing the object side is a concave surface and the surface thereof facing the image side is a concave surface, the surface of the second lens L2 facing the object side is a convex surface and the surface thereof facing the image side is a convex surface, and the concave surface of the first lens L1 facing the image side and the convex surface of the second lens L2 facing the object side are cemented together;

the third lens L3, the fourth lens L4 and the fifth lens L5 are combined to form a cemented lens, wherein the surface of the third lens L3 facing the object side is a concave surface and the surface thereof facing the image side is a convex surface, the surface of the fourth lens L4 facing the object side is a concave surface and the surface thereof facing the image side is a planar surface, the surface of the fifth lens L5 facing the object side is a planar surface and the surface thereof facing the image side is a convex surface, the convex surface of the third lens L3 facing the image side and the concave surface of the fourth lens L4 facing the object side are cemented together, and the planar surface of the fourth lens L4 facing the image side and the planar surface of the fifth lens L5 facing the object side are cemented together;

the surface of the sixth lens L6 facing the object side is a convex surface and the surface thereof facing the image side is a convex surface;

the seventh lens L7 and the eighth lens L8 are combined to form a cemented lens, wherein the surface of the seventh lens L7 facing the object side is a convex surface and the surface thereof facing the image side is a concave surface, the surface of the eighth lens L8 facing the object side is a convex surface and the surface thereof facing the image side is a convex surface, and the concave surface of the seventh lens L7 facing the image side and the convex surface of the eighth lens L8 facing the object side are cemented together;

the ninth lens L9, the tenth lens L10 and the eleventh lens L11 are combined to form a cemented lens, wherein the surface of the ninth lens L9 facing the object side is a convex surface and the surface thereof facing the image side is a planar surface, the surface of the tenth lens L10 facing the object side is a planar surface and the surface thereof facing the image side is a concave surface, the surface of the eleventh lens L11 facing the object side is a convex surface and the surface thereof facing the image side is a convex surface, the planar surface of the ninth lens L9 facing the image side and the planar surface of the tenth lens L10 facing the object side are cemented together, and the concave surface of the tenth lens L10 facing the image side and the convex surface of the eleventh lens L11 facing the object side are cemented together;

the twelfth lens L12 and the thirteenth lens L13 are combined to form a cemented lens, wherein the surface of the twelfth lens L12 facing the object side is a convex surface and the surface thereof facing the image side is a concave surface, the surface of the thirteenth lens L13 facing the object side is a convex surface and the surface thereof facing the image side is a concave surface, and the concave surface of the twelfth lens L12 facing the image side and the convex surface of the thirteenth lens L13 facing the object side are cemented together;

the fourteenth lens L14 and the fifteenth lens L15 are combined to form a cemented lens, wherein the surface of the fourteenth lens L14 facing the object side is a concave surface and the surface thereof facing the image side is a concave surface, the surface of the fifteenth lens L15 facing the object side is a convex surface and the surface thereof facing the image side is a convex surface, and the concave surface of the fourteenth lens L14 facing the image side and the convex surface of the fifteenth lens L15 facing the object side are cemented together;

the surface of the sixth lens L16 facing the object side is a concave surface and the surface thereof facing the image side is a convex surface;

the seventeenth lens L17 and the eighteenth lens L18 are combined to form a cemented lens, wherein the surface of the seventeenth lens L17 facing the object side is a convex surface and the surface thereof facing the image side is a convex surface, the surface of the eighteenth lens L18 facing the object side is a concave surface and the surface thereof facing the image side is a concave surface, and the convex surface of the seventeenth lens L17 facing the image side and the concave surface of the eighteenth lens L18 facing the object side are cemented together; and the surface of the nineteenth lens L19 facing the object side is a convex surface and the surface thereof facing the image side is a convex surface.

Further preferably, in one embodiment, the concave surface of the first lens L1 facing the object side is a first lens surface, the surface where the first lens L1 and the second lens L2 are cemented together is a second lens surface, the convex surface of the second lens L2 facing the image side is a third lens surface, the concave surface of the third lens L3 facing the object side is a fourth lens surface, the surface where the third lens L3 and the fourth lens L4 are cemented together is a fifth lens surface, the surface where the fourth lens L4 and the fifth lens L5 are cemented together is a sixth lens surface, the convex surface of the fifth lens L5 facing the object side is a seventh lens surface, the convex surface of the sixth lens L6 facing the object side is an eighth lens surface, the convex surface of the sixth lens L6 facing the image side is a ninth lens surface, the convex surface of the seventh lens L7 facing the object side is a tenth lens surface, the surface where the seventh lens L7 and the eighth lens L8 are cemented together is an eleventh lens surface, the convex surface of the eighth lens L8 facing the image side is a twelfth lens surface, the convex surface of the ninth lens L9 facing the object side is a thirteenth lens surface, the surface where the ninth lens L9 and the tenth lens L10 are cemented together is a fourteenth lens surface, the surface where the tenth lens L10 and the eleventh lens L11 are cemented together is a fifteenth lens surface, the convex surface of the eleventh lens L11 facing the image side is a sixteenth lens surface, the convex surface of the twelfth lens L12 facing the image side is a seventeenth lens surface, the surface where the twelfth lens L12 and the thirteenth lens L13 are cemented together is an eighteenth lens surface, the concave surface of the thirteenth lens L13 facing the image side is a nineteenth lens surface, the concave surface of the fourteenth lens L14 facing the object side is a twentieth lens surface, the surface where the fourteenth lens L14 and the fifteenth lens L15 are cemented together is a twenty-first lens surface, the convex surface of the fifteenth lens L15 facing the image side is a twenty-second lens surface, the concave surface of the sixteenth lens L16 facing the object side is a twenty-third lens surface, the convex surface of the sixteenth lens L16 facing the image side is a twenty-fourth lens surface, the convex surface of the seventeenth lens L17 facing the object side is a twenty-fifth lens surface, the surface where the seventeenth lens L17 and the eighteenth lens L18 are cemented together is a twenty-sixth lens surface, the concave surface of the eighteenth lens L18 facing the image side is a twenty-seventh lens surface, the convex surface of the nineteenth lens L19 facing the object side is a twenty-eighth lens surface, and the convex surface of the nineteenth lens L19 facing the image side is a twenty-ninth lens surface.

Further preferably, in one embodiment, the parameters of the first lens surface comprise R1=−10.834 to −10.098 mm, D1=6.673 to 6.921 mm, and ϕ1=12.145 to 13.514 mm, where R1 is the radius of curvature of the first lens surface, D1 is the lens surface distance of the first lens surface, and ϕ1 is the effective clear aperture of the first lens surface;

the parameters of the second lens surface comprise R2=44.389 to 46.237 mm, D2=15.786 to 16.234 mm, ϕ2=23.597 to 24.415 mm, where R2 is the radius of curvature of the second lens surface, D2 is the lens surface distance of the second lens surface, and ϕ2 is the effective clear aperture of the second lens surface;

the parameters of the third lens surface comprise R3=−31.457 to −29.467 mm, D3=0.125 to 0.231 mm, and ϕ3=33.856 to 34.915 mm, where R3 is the radius of curvature of the third lens surface, D3 is the lens surface distance of the third lens surface, and ϕ3 is the effective clear aperture of the third lens surface;

the parameters of the fourth lens surface comprise R4=−118.657 to −114.324 mm, D4=9.324 to 9.639 mm, and ϕ4=38.467 to 40.125 mm, where R4 is the radius of curvature of the fourth lens surface, D4 is the lens surface distance of the fourth lens surface, and ϕ4 is the effective clear aperture of the fourth lens surface;

the parameters of the fifth lens surface comprise R5=−37.541 to −34.654 mm, D5=6.042 to 6.203 mm, ϕ5=41.921 to 43.015 mm, where R5 is the radius of curvature of the fifth lens surface, D5 is the lens surface distance of the fifth lens surface, and ϕ5 is the effective clear aperture of the fifth lens surface;

the parameters of the sixth lens surface comprise R6=∞, D6=13.658 to 14.132 mm, ϕ6=49.687 to 51.032 mm, where R6 is the radius of curvature of the sixth lens surface, D6 is the lens surface distance of the sixth lens surface, and ϕ6 is the effective clear aperture of the sixth lens surface;

the parameters of the seventh lens surface comprise R7=−67.671 to −64.321 mm, D7=7.825 to 8.214 mm, and ϕ7=54.598 to 55.127 mm, where R7 is the radius of curvature of the seventh lens surface, D7 is the lens surface distance of the seventh lens surface, and ϕ7 is the effective clear aperture of the seventh lens surface;

the parameters of the eighth lens surface comprise R8=124.982 to 130.475 mm, D8=24.658 to 25.479 mm, and ϕ8=63.985 to 64.125 mm, where R8 is the radius of curvature of the eighth lens surface, D8 is the lens surface distance of the eighth lens surface, and ϕ8 is the effective clear aperture of the eighth lens surface;

the parameters of the ninth lens surface comprise R9=−75.984 to −73.411 mm, D9=0.265 to 0.478 mm, and ϕ9=64.934 to 65.984 mm, where R9 is the radius of curvature of the ninth lens surface, D9 is the lens surface distance of the ninth lens surface, and ϕ9 is the effective clear aperture of the ninth lens surface;

the parameters of the tenth lens surface comprise R10=308.458 to 315.541 mm, D10=6.475 to 6.632 mm, and ϕ10=62.798 to 63.327 mm, where R10 is the radius of curvature of the tenth lens surface, D10 is the lens surface distance of the tenth lens surface, and ϕ10 is the effective clear aperture of the tenth lens surface;

the parameters of the eleventh lens surface comprise R11=38.645 to 44.654 mm, D11=18.764 to 19.241 mm, and ϕ11=59.024 to 60.147 mm, where R11 is the radius of curvature of the eleventh lens surface, D11 is the lens surface distance of the eleventh lens surface, and ϕ11 is the effective clear aperture of the eleventh lens surface;

the parameters of the twelfth lens surface comprise R12=−328.455 to −317.951 mm, D12=3.074 to 4.021 mm, ϕ12=59.312 to 60.147 mm, where R12 is the radius of curvature of the twelfth lens surface, D12 is the lens surface distance of the twelfth lens surface, and ϕ12 is the effective clear aperture of the twelfth lens surface;

the parameters of the thirteenth lens surface comprise R13=43.217 to 46.398 mm, D13=15.846 to 16.352 mm, and ϕ13=58.498 to 59.214 mm, where R13 is the radius of curvature of the thirteenth lens surface, D13 is the lens surface distance of the thirteenth lens surface, and ϕ13 is the effective clear aperture of the thirteenth lens surface;

the parameters of the fourteenth lens surface comprise R14=∞, D14=6.045 to 6.134 mm, and ϕ14=56.413 to 57.041 mm, where R14 is the radius of curvature of the fourteenth lens surface, D14 is the lens surface distance of the fourteenth lens surface, and ϕ14 is the effective clear aperture of the fourteenth lens surface;

the parameters of the fifteenth lens surface comprise R15=41.657 to 48.691 mm, D15=15.231 to 16.098 mm, and ϕ15=49.547 to 50.412 mm, where R15 is the radius of curvature of the fifteenth lens surface, D15 is the lens surface distance of the fifteenth lens surface, and ϕ15 is the effective clear aperture of the fifteenth lens surface;

the parameters of the sixteenth lens surface comprise R16=−163.485 to −158.547 mm, D16=3.987 to 4.021 mm, and ϕ16=49.134 to 50.145 mm, where R16 is the radius of curvature of the sixteenth lens surface, D16 is the lens surface distance of the sixteenth lens surface, and ϕ16 is the effective clear aperture of the sixteenth lens surface;

the parameters of the seventeenth lens surface comprise R17=38.468 to 44.651 mm, D17=10.046 to 10.541 mm, and ϕ17=40.165 to 40.941 mm, where R17 is the radius of curvature of the seventeenth lens surface, D17 is the lens surface distance of the seventeenth lens surface, and ϕ17 is the effective clear aperture of the seventeenth lens surface;

the parameters of the eighteenth lens surface comprise R18=60.134 to 71.347 mm, D18=3.647 to 4.067 mm, and ϕ18=35.145 to 35.654 mm, where R18 is the radius of curvature of the eighteenth lens surface, D18 is the lens surface distance of the eighteenth lens surface, and ϕ18 is the effective clear aperture of the eighteenth lens surface;

the parameters of the nineteenth lens surface comprise R19=26.547 to 32.541 mm, D19=18.034 to 19.654 mm, and ϕ19=29.132 to 29.984 mm, where R19 is the radius of curvature of the nineteenth lens surface, D19 is the lens surface distance of the nineteenth lens surface, and ϕ19 is the effective clear aperture of the nineteenth lens surface;

the parameters of the twentieth lens surface comprise R20=−29.451 to −32.475 mm, D20=2.458 to 4.425 mm, and ϕ20=26.123 to 26.841 mm, where R20 is the radius of curvature of the twentieth lens surface, D20 is the lens surface distance of the twentieth lens surface, and ϕ20 is the effective clear aperture of the twentieth lens surface;

the parameters of the twenty-first lens surface comprise R21=45.374 to 49.324 mm, D21=22.348 to 25.487 mm, and ϕ21=30.546 to 30.987 mm, where R21 is the radius of curvature of the twenty-first lens surface, D21 is the lens surface distance of the twenty-first lens surface, and ϕ21 is the effective clear aperture of the twenty-first lens surface;

the parameters of the twenty-second lens surface comprise R22=−75.341 to −66.874 mm, D22=26.784 to 29.541 mm, ϕ22=40.568 to 41.025 mm, where R22 is the radius of curvature of the twenty-second lens surface, D22 is the lens surface distance of the twenty-second lens surface, and ϕ22 is the effective clear aperture of the twenty-second lens surface;

the parameters of the twenty-third lens surface comprise R23=−592.657 to −554.654 mm, D23=9.849 to 10.244 mm, and ϕ23=56.154 to 56.987 mm, where R23 is the radius of curvature of the twenty-third lens surface, D23 is the lens surface distance of the twenty-third lens surface, and ϕ23 is the effective clear aperture of the twenty-third lens surface;

the parameters of the twenty-fourth lens surface comprise R24=−89.354 to −85.214 mm, D24=0.178 to 0.211 mm, and ϕ24=58.324 to 59.016, where R24 is the radius of curvature of the twenty-fourth lens surface, D24 is the lens surface distance of the twenty-fourth lens surface, and ϕ24 is the effective clear aperture of the twenty-fourth lens surface;

the parameters of the twenty-fifth lens surface comprise R25=244.534 to 251.541 mm, D25=9.047 to 10.231 mm, and ϕ25=58.314 to 59.154 mm, where R25 is the radius of curvature of the twenty-fifth lens surface, D25 is the lens surface distance of the twenty-fifth lens surface, and ϕ25 is the effective clear aperture of the twenty-fifth lens surface;

the parameters of the twenty-sixth lens surface comprise R26=−141.354 to −136.214 mm, D26=9.475 to 11.347 mm, and ϕ26=57.987 to 59.015 mm, where R26 is the radius of curvature of the twenty-sixth lens surface, D26 is the lens surface distance of the twenty-sixth lens surface, and ϕ26 is the effective clear aperture of the twenty-sixth lens surface;

the parameters of the twenty-seventh lens surface comprise R27=84.394 to 87.398 mm, D27=44.674 to 50.379 mm, and ϕ27=56.124 to 57.621 mm, where R27 is the radius of curvature of the twenty-seventh lens surface, D27 is the lens surface distance of the twenty-seventh lens surface, and ϕ27 is the effective clear aperture of the twenty-seventh lens surface;

the parameters of the twenty-eighth lens surface comprise R28=132.437 to 136.124 mm, D28=10.754 to 11.314 mm, and ϕ28=65.564 to 66.314 mm, where R28 is the radius of curvature of the twenty-eighth lens surface, D28 is the lens surface distance of the twenty-eighth lens surface, and ϕ28 is the effective clear aperture of the twenty-eighth lens surface; and the parameters of the twenty-ninth lens surface comprise R29=−326.154 to −317.645 mm, D29=123.457 to 134.637 mm, and ϕ29=65.324 to 66.654 mm, where R29 is the radius of curvature of the twenty-ninth lens surface, D29 is the lens surface distance of the twenty-ninth lens surface, and ϕ29 is the effective clear aperture of the twenty-ninth lens surface.

Further preferably, in one embodiment, the cemented lens formed by the first lens and the second lens has a focal length of −29.522 mm, the cemented lens formed by the third lens, the fourth lens and the fifth lens has a focal length of 127.315 mm, the sixth lens has a focal length of 94.234 mm, the cemented lens formed by the seventh lens and the eighth lens has a focal length of −570.237 mm, the cemented lens formed by the ninth lens, the tenth lens and the eleventh lens has a focal length of 121.547 mm, the cemented lens formed by the twelfth lens and the thirteenth lens has a focal length of −226.157 mm, the cemented lens formed by the fourteenth lens and the fifteenth lens has a focal length of −51.524 mm, the sixteenth lens has a focal length of 101.647 mm, the cemented lens formed by the seventeenth lens and the eighteenth lens has a focal length of −437.35 mm, and the nineteenth lens has a focal length of 149.951 mm.

Further preferably, in one embodiment, the first lens L1 has a refractive index/Abbe number of 1.85/30.06, the second lens L2 has a refractive index/Abbe number of 1.693/49.2, the third lens L3 has a refractive index/Abbe number of 1.922/20.882, the fourth lens L4 has a refractive index/Abbe number of 1.816/46.5, the fifth lens L5 has a refractive index/Abbe number of 1.804/46.56, the sixth lens L6 has a refractive index/Abbe number of 1.5/66.05, the seventh lens L7 has a refractive index/Abbe number of 1.64/60.21, the eighth lens L8 has a refractive index/Abbe number of 1.438/94.94, the ninth lens L9 has a refractive index/Abbe number of 1.438/94.94, the tenth lens L10 has a refractive index/Abbe number of 1.755/27.54, the eleventh lens L11 has a refractive index/Abbe number of 1.5/66.05, the twelfth lens L12 has a refractive index/Abbe number of 1.804/46.56, the thirteenth lens L13 has a refractive index/Abbe number of 1.784/25.72, the fourteenth lens L14 has a refractive index/Abbe number of 1.816/46.56, the fifteenth lens L15 has a refractive index/Abbe number of 1.693/49.23, the sixteenth lens L16 has a refractive index/Abbe number of 1.755/27.54, the seventeenth lens L17 has a refractive index/Abbe number of 1.497/81.59, the eighteenth lens L18 has a refractive index/Abbe number of 1.497/81.59, and the nineteenth lens L19 has a refractive index/Abbe number of 1.64/60.214.

Further preferably, in one embodiment, the objective lens satisfies: $0.5 \leq NA < 0.7$, the NA denoting the numerical aperture of the objective lens.

Further preferably, in one embodiment, the objective lens satisfies: 6 mm≤FOV<10 mm, the FOV denoting the object-side effective field of view of the objective lens.

Further preferably, in one embodiment, the objective lens satisfies: 400 nm≤Wavelength<1000 nm, where the Wavelength denotes the effective working wavelength of the objective lens within which effective achromatism and elimination of spherical aberration, comatic aberration, astigmatism, curvature of field, distortion, axial chromatic aberration and chromatic difference of magnification are achieved.

Further preferably, in one embodiment, the objective lens satisfies: $2\times10^8 \leq SBP < 1.08\times10^9$, where the SBP denotes the imaging throughput of the objective lens, $SBP=2\times(FOV/r_{xy})^2$, and the $r_{xy}$ denotes the lateral resolution of the objective lens.

Figure 2:
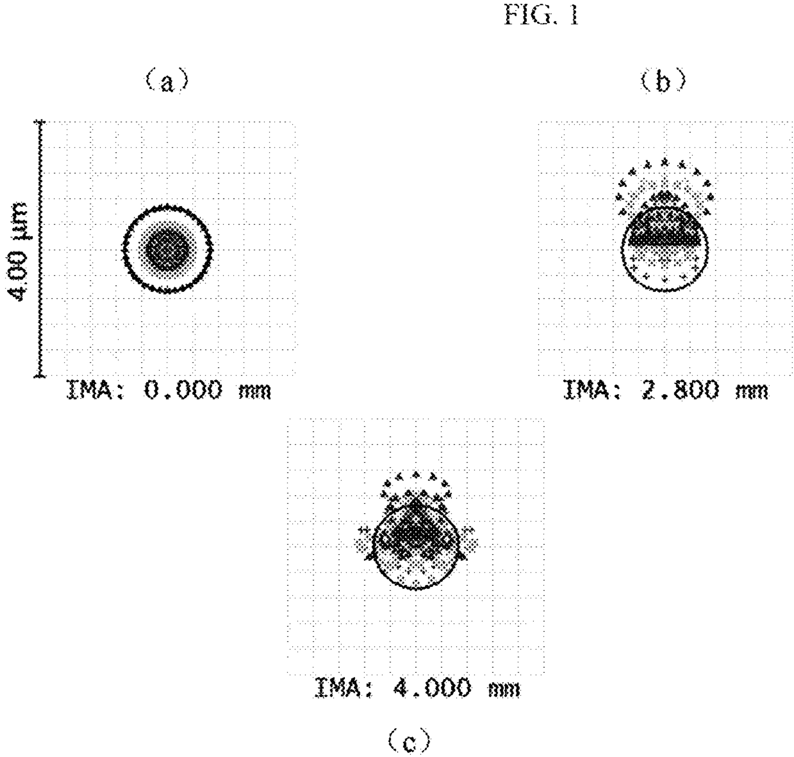
FIG. 2 is a spot diagram of an objective lens in one embodiment during focusing, FIGS. (a) to (c) showing the focusing situations of light with different wavelengths from 0.488 μm to 0.925 μm at the focus at fields of view of 0, 0.7 and 1, respectively.

FIG. 2 is a spot diagram of light spots of an objective lens provided in an embodiment of the present application during focusing The three FIGS. show the focusing situations of light with different wavelengths from 0.488 μm to 0.925 μm at the focus at fields of view of 0, 0.7 and 1, respectively. Wherein, the focused light spots at each wavelength and each field of view are within the diameter of the Airy disk, which indicates that the aberration of the objective lens is well optimized and the focusing effect is excellent.

Figure 3:
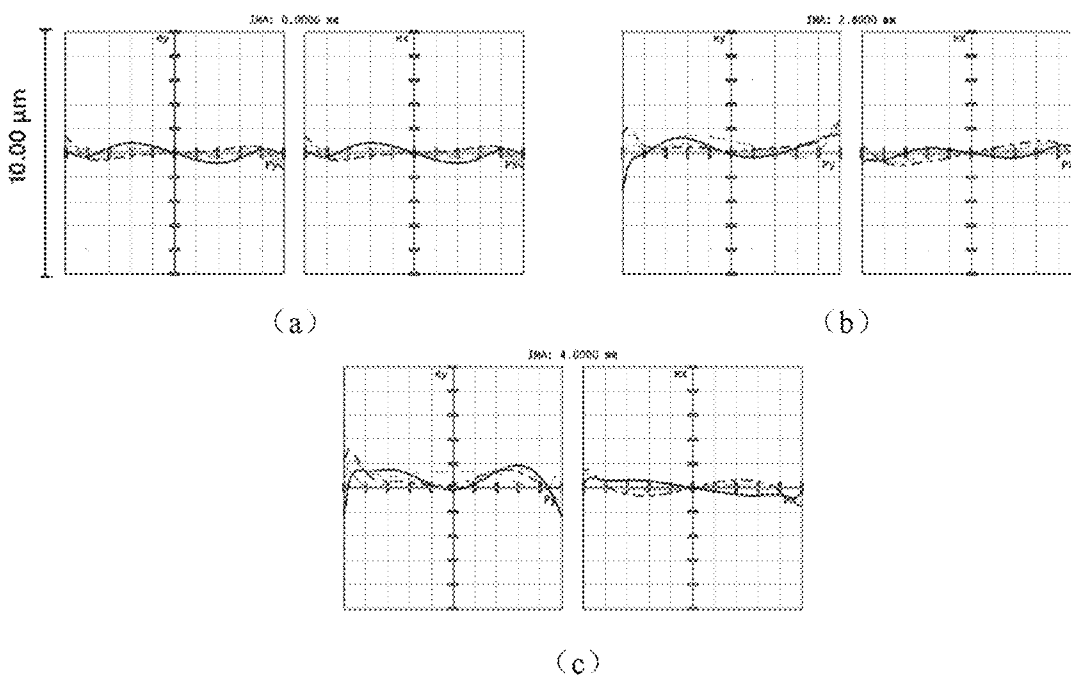
FIG. 3 is an aberration diagram of an objective lens in one embodiment, FIGS. (a) to (c) showing the aberration distributions after light with different wavelengths from 0.488 μm to 0.925 μm passes through the objective lens at fields of view of 0, 0.7 and 1, respectively.

FIG. 3 is an aberration diagram of an objective lens provided in an embodiment of the present application. The three FIGS. show the aberration distributions after light with different wavelengths from 0.488 μm to 0.925 μm passes through the objective lens at fields of view of 0, 0.7 and 1, respectively. The abscissas Py and Px indicate the locations of the entrance pupil, and the ordinates ey and ex indicate the beam distributions at the image plane, reflecting the magnitudes of aberration. In the FIGS., different lines indicate different wavelengths of light, and the longitudinal axis indicates the magnitude of aberration. The range of the longitudinal axis in the FIGS. is ±5 μm, and it can be seen from the curves that the aberration at each wavelength and each field of view is less than ±1 μm, which indicates that the aberration of the objective lens is well optimized and the imaging effect is excellent.

Figure 4:
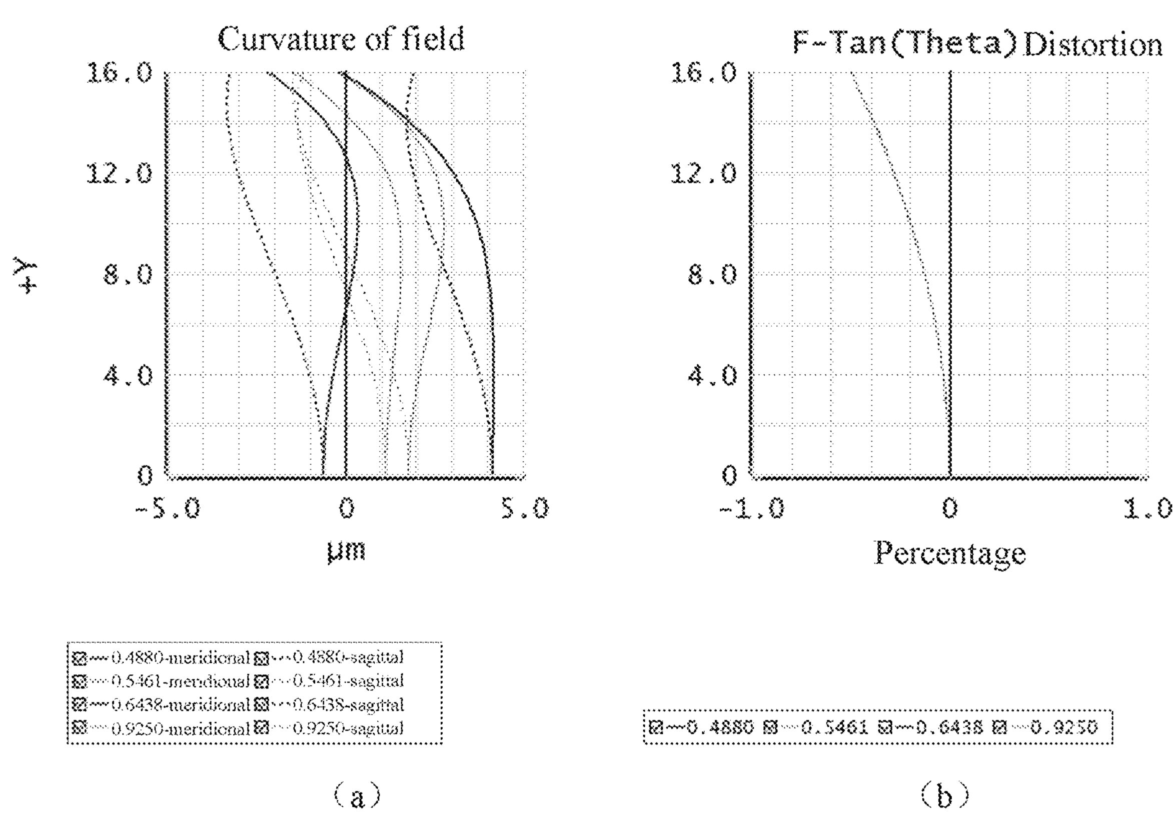
FIG. 4 is curvature of field and distortion diagrams of an objective lens in one embodiment, wherein FIG. (a) is a curvature of field diagram of the objective lens and FIG. (b) is a distortion diagram of the objective lens.

FIG. 4 is curvature of field and distortion diagrams of an objective lens provided in an embodiment of the present application. FIG. (a) is a curvature of field diagram of the objective lens, with the ordinate as the field of view in the direction of incident light of the objective lens and the abscissa as the curvature of field value. The curvature of field values of all fields of view after light with different wavelengths from 0.488 μm to 0.925 μm passes through the objective lens are all within ±4 μm, which indicates that the difference in the best focus point between the edge field of view and the center field of view is less than $2\lambda/NA^2$ and meets the requirement for flat-field imaging. In the FIG., the ordinates are different imaging fields of view at the image plane, and the abscissas are curvature of field values, with a maximum of 5 μm and a minimum of −5 μm. FIG. (b) is a distortion diagram of the objective lens, and the distortions are less than 0.5% across the entire field of view, which indicates that the objective lens has excellent large-field of view imaging performance. In the FIG., the ordinates are image-side fields of view during imaging, and the abscissas are distortions, with a minimum of −1% and a maximum of 1%.

Figure 5:
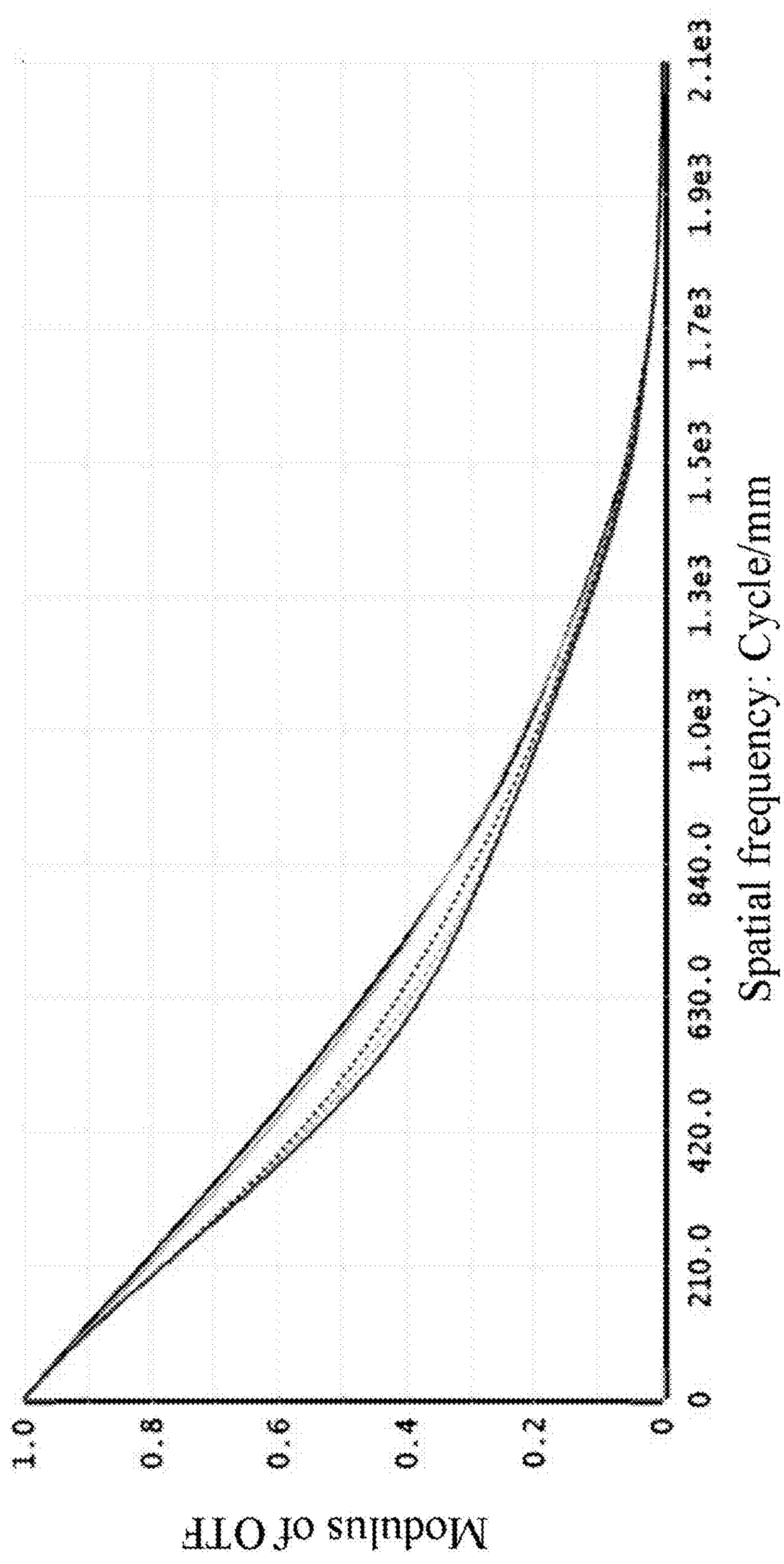
FIG. 5 is a transfer function curve diagram of an objective lens in one embodiment.

FIG. 5 is an optical transfer function diagram of an objective lens provided in an embodiment of the present application. The ordinates are modulus values of a normalized transfer function, and the abscissas are spatial frequencies. The outermost line is a transfer function curve of the system under a diffraction limit. It can be seen that transfer functions of the system at all wavelengths and fields of view are close to the diffraction limit, and the system has excellent imaging contrast.

Figure 6:
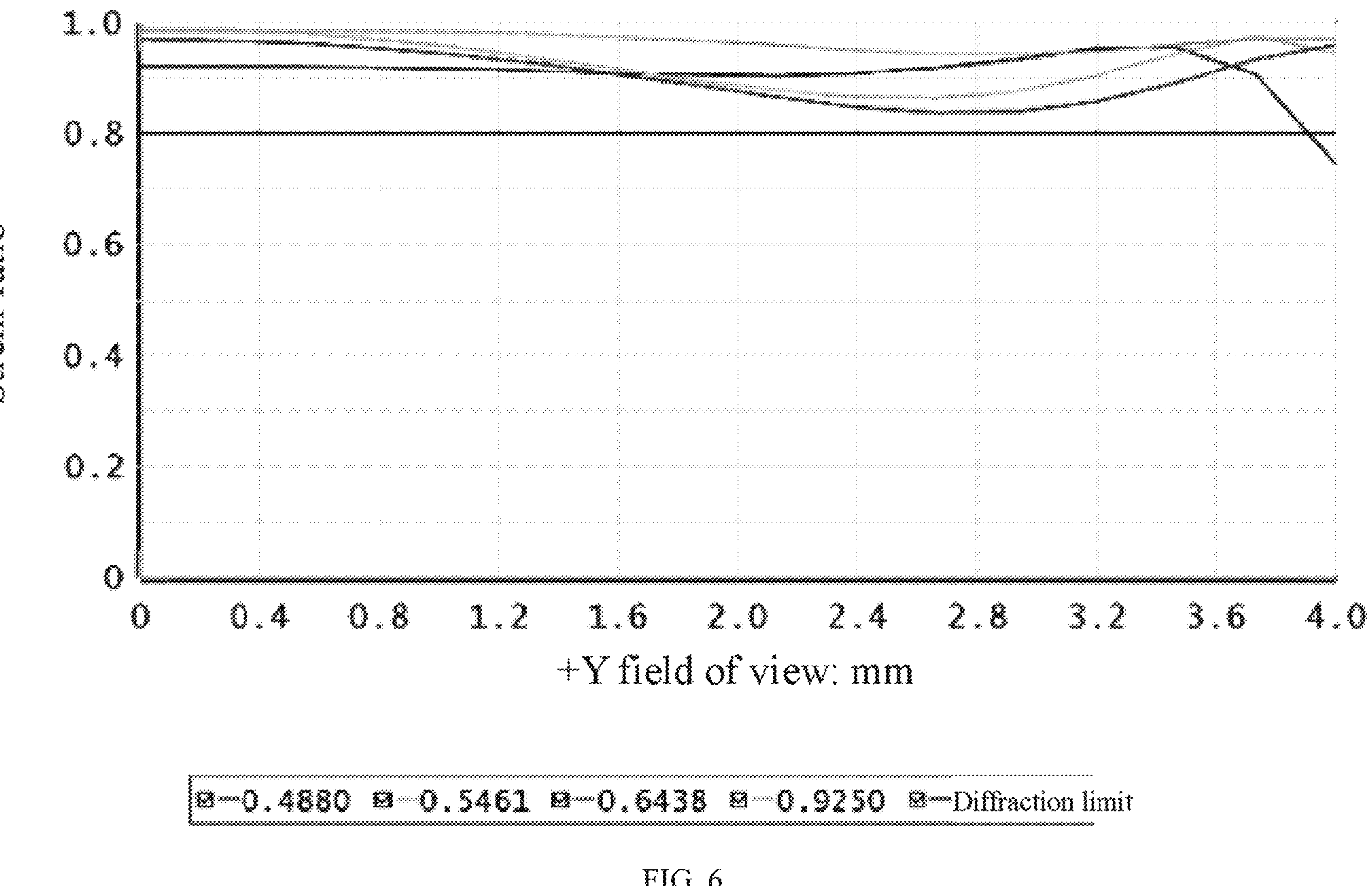
FIG. 6 is a Strehl ratio diagram of an objective lens in one embodiment.

FIG. 6 is a Strehl ratio diagram of an objective lens provided in an embodiment of the present application. In the FIG., the Strell ratios of light with different wavelengths from 0.488 μm to 0.925 μm in the entire field of view are higher than 0.8, which indicates that the focusing point of the objective lens at each field of view in the working waveband is within the diffraction limit, the aberration is well optimized and the imaging performance is excellent.

Compared with previous similar objective lenses, the present objective lens has a higher resolution, a larger imaging field of view and a wider working wave band, and can meet the requirements of visible light and near-infrared two-photon, large-field of view, high-resolution imaging.

The basic principles, main features and advantages of the present application are showed and described above. Those skilled in the art will appreciate that the present application is not limited to the above-mentioned embodiments, and that the above-mentioned embodiments and what are described in the description are only intended to illustrate the principles of the present application. Various changes and modifications may be made to the present application without departing from the spirit and scope of the present application, and shall fall within the claimed scope of the present application. The scope of protection claimed in the present application is defined by the appended claims and their equivalents.

The invention claimed is:

1. A large-field of view, high-resolution broadband objective lens, wherein the objective lens comprises nineteen spherical lenses that are arranged on the same optical axis, and the nineteen lenses sequentially comprise, from an object side to an image side, a first lens, a second lens, a third lens, a fourth lens, a fifth lens, a sixth lens, a seventh lens, an eighth lens, a ninth lens, a tenth lens, an eleventh lens, a twelfth lens, a thirteenth lens, a fourteenth lens, a fifteenth lens, a sixteenth lens, a seventeenth lens, an eighteenth lens and a nineteenth lens, wherein, the first lens and the second lens are combined to form a cemented lens, wherein the surface of the first lens facing the object side is a concave surface and the surface thereof facing the image side is a concave surface, the surface of the second lens facing the object side is a convex surface and the surface thereof facing the image side is a convex surface, and the concave surface of the first lens facing the image side and the convex surface of the second lens facing the object side are cemented together;

the third lens, the fourth lens and the fifth lens are combined to form a cemented lens, wherein the surface of the third lens facing the object side is a concave surface and the surface thereof facing the image side is a convex surface, the surface of the fourth lens facing the object side is a concave surface and the surface thereof facing the image side is a planar surface, the surface of the fifth lens facing the object side is a planar surface and the surface thereof facing the image side is a convex surface, the convex surface of the third lens facing the image side and the concave surface of the fourth lens facing the object side are cemented together, and the planar surface of the fourth lens facing the image side and the planar surface of the fifth lens facing the object side are cemented together;

the surface of the sixth lens facing the object side is a convex surface and the surface thereof facing the image side is a convex surface;

the seventh lens and the eighth lens are combined to form a cemented lens, wherein the surface of the seventh lens facing the object side is a convex surface and the surface thereof facing the image side is a concave surface, the surface of the eighth lens facing the object side is a convex surface and the surface thereof facing the image side is a convex surface, and the concave surface of the seventh lens facing the image side and the convex surface of the eighth lens facing the object side are cemented together;

the ninth lens, the tenth lens and the eleventh lens are combined to form a cemented lens, wherein the surface of the ninth lens facing the object side is a convex surface and the surface thereof facing the image side is a planar surface, the surface of the tenth lens facing the object side is a planar surface and the surface thereof facing the image side is a concave surface, the surface of the eleventh lens facing the object side is a convex surface and the surface thereof facing the image side is a convex surface, the planar surface of the ninth lens facing the image side and the planar surface of the tenth lens facing the object side are cemented together, and the concave surface of the tenth lens facing the image side and the convex surface of the eleventh lens facing the object side are cemented together;

the twelfth lens and the thirteenth lens are combined to form a cemented lens, wherein the surface of the twelfth lens facing the object side is a convex surface and the surface thereof facing the image side is a concave surface, the surface of the thirteenth lens facing the object side is a convex surface and the surface thereof facing the image side is a concave surface, and the concave surface of the twelfth lens facing the image side and the convex surface of the thirteenth lens facing the object side are cemented together;

the fourteenth lens and the fifteenth lens are combined to form a cemented lens, wherein the surface of the fourteenth lens facing the object side is a concave surface and the surface thereof facing the image side is a concave surface, the surface of the fifteenth lens facing the object side is a convex surface and the surface thereof facing the image side is a convex surface, and the concave surface of the fourteenth lens facing the image side and the convex surface of the fifteenth lens facing the object side are cemented together;

the surface of the sixteenth lens facing the object side is a concave surface and the surface thereof facing the image side is a convex surface;

the seventeenth lens and the eighteenth lens are combined to form a cemented lens, wherein the surface of the seventeenth lens facing the object side is a convex surface and the surface thereof facing the image side is a convex surface, the surface of the eighteenth lens facing the object side is a concave surface and the surface thereof facing the image side is a concave surface, and the convex surface of the seventeenth lens facing the image side and the concave surface of the eighteenth lens facing the object side are cemented together; and the surface of the nineteenth lens facing the object side is a convex surface and the surface thereof facing the image side is a convex surface;

wherein, the concave surface of the first lens facing the object side is a first lens surface, the surface where the first lens and the second lens are cemented together is a second lens surface, the convex surface of the second lens facing the image side is a third lens surface, the concave surface of the third lens facing the object side is a fourth lens surface, the surface where the third lens and the fourth lens are cemented together is a fifth lens surface, the surface where the fourth lens and the fifth lens are cemented together is a sixth lens surface, the convex surface of the fifth lens facing the image side is a seventh lens surface, the convex surface of the sixth lens facing the object side is an eighth lens surface, the convex surface of the sixth lens facing the image side is a ninth lens surface, the convex surface of the seventh lens facing the object side is a tenth lens surface, the surface where the seventh lens and the eighth lens are cemented together is an eleventh lens surface, the convex surface of the eighth lens facing the image side is a twelfth lens surface, the convex surface of the ninth lens facing the object side is a thirteenth lens surface, the surface where the ninth lens and the tenth lens are cemented together is a fourteenth lens surface, the surface where the tenth lens and the eleventh lens are cemented together is a fifteenth lens surface, the convex surface of the eleventh lens facing the image side is a sixteenth lens surface, the convex surface of the twelfth lens facing the object side is a seventeenth lens surface, the surface where the twelfth lens and the thirteenth lens are cemented together is an eighteenth lens surface, the concave surface of the thirteenth lens facing the image side is a nineteenth lens surface, the concave surface of the fourteenth lens facing the object side is a twentieth lens surface, the surface where the fourteenth lens and the fifteenth lens are cemented together is a twenty-first lens surface, the convex surface of the fifteenth lens facing the image side is a twenty-second lens surface, the concave surface of the sixteenth lens facing the object side is a twenty-third lens surface, the convex surface of the sixteenth lens facing the image side is a twenty-fourth lens surface, the convex surface of the seventeenth lens facing the object side is a twenty-fifth lens surface, the surface where the seventeenth lens and the eighteenth lens are cemented together is a twenty-sixth lens surface, the concave surface of the eighteenth lens facing the image side is a twenty-seventh lens surface, the convex surface of the nineteenth lens facing the object side is a twenty-eighth lens surface, and the convex surface of the nineteenth lens facing the image side is a twenty-ninth lens surface;

wherein, the parameters of the first lens surface comprise R1=−10.834 to −10.098 mm, D1=6.673 to 6.921 mm, and $\phi$1=12.145 to 13.514 mm, where R1 is the radius of curvature of the first lens surface, D1 is the lens surface distance of the first lens surface, and $\phi$1 is the effective clear aperture of the first lens surface;

the parameters of the second lens surface comprise R2=44.389 to 46.237 mm, D2=15.786 to 16.234 mm, and $\phi$2=23.597 to 24.415 mm, where R2 is the radius of curvature of the second lens surface, D2 is the lens surface distance of the second lens surface, and $\phi$2 is the effective clear aperture of the second lens surface;

the parameters of the third lens surface comprise R3=−31.457 to −29.467 mm, D3=0.125 to 0.231 mm, and $\phi$3=33.856 to 34.915 mm, where R3 is the radius of curvature of the third lens surface, D3 is the lens surface distance of the third lens surface, and $\phi$3 is the effective clear aperture of the third lens surface;

the parameters of the fourth lens surface comprise R4=−118.657 to −114.324 mm, D4=9.324 to 9.639 mm, and $\phi$4=38.467 to 40.125 mm, where R4 is the radius of curvature of the fourth lens surface, D4 is the lens surface distance of the fourth lens surface, and $\phi$4 is the effective clear aperture of the fourth lens surface;

the parameters of the fifth lens surface comprise R5=−37.541 to −34.654 mm, D5=6.042 to 6.203 mm, and $\phi$5=41.921 to 43.015 mm, where R5 is the radius of curvature of the fifth lens surface, D5 is the lens surface distance of the fifth lens surface, and $\phi$5 is the effective clear aperture of the fifth lens surface;

the parameters of the sixth lens surface comprise R6=∞, D6=13.658 to 14.132 mm, and 06=49.687 to 51.032 mm, where R6 is the radius of curvature of the sixth lens surface, D6 is the lens surface distance of the sixth lens surface, and ϕ6 is the effective clear aperture of the sixth lens surface;

the parameters of the seventh lens surface comprise R7=−67.671 to −64.321 mm, D7=7.825 to 8.214 mm, and ϕ7=54.598 to 55.127 mm, where R7 is the radius of curvature of the seventh lens surface, D7 is the lens surface distance of the seventh lens surface, and ϕ7 is the effective clear aperture of the seventh lens surface;

the parameters of the eighth lens surface comprise R8=124.982 to 130.475 mm, D8=24.658 to 25.479 mm, and ϕ8=63.985 to 64.125 mm, where R8 is the radius of curvature of the eighth lens surface, D8 is the lens surface distance of the eighth lens surface, and ϕ8 is the effective clear aperture of the eighth lens surface;

the parameters of the ninth lens surface comprise R9=−75.984 to −73.411 mm, D9=0.265 to 0.478 mm, and ϕ9=64.934 to 65.984 mm, where R9 is the radius of curvature of the ninth lens surface, D9 is the lens surface distance of the ninth lens surface, and ϕ9 is the effective clear aperture of the ninth lens surface;

the parameters of the tenth lens surface comprise R10=308.458 to 315.541 mm, D10=6.475 to 6.632 mm, and ϕ10=62.798 to 63.327 mm, where R10 is the radius of curvature of the tenth lens surface, D10 is the lens surface distance of the tenth lens surface, and ϕ10 is the effective clear aperture of the tenth lens surface;

the parameters of the eleventh lens surface comprise R11=38.645 to 44.654 mm, D11=18.764 to 19.241 mm, and ϕ11=59.024 to 60.147 mm, where R11 is the radius of curvature of the eleventh lens surface, D11 is the lens surface distance of the eleventh lens surface, and ϕ11 is the effective clear aperture of the eleventh lens surface;

the parameters of the twelfth lens surface comprise R12=−328.455 to −317.951 mm, D12=3.074 to 4.021 mm, and ϕ12=59.312 to 60.147 mm, where R12 is the radius of curvature of the twelfth lens surface, D12 is the lens surface distance of the twelfth lens surface, and ϕ12 is the effective clear aperture of the twelfth lens surface;

the parameters of the thirteenth lens surface comprise R13=43.217 to 46.398 mm, D13=15.846 to 16.352 mm, and ϕ13=58.498 to 59.214 mm, where R13 is the radius of curvature of the thirteenth lens surface, D13 is the lens surface distance of the thirteenth lens surface, and ϕ13 is the effective clear aperture of the thirteenth lens surface;

the parameters of the fourteenth lens surface comprise R14=∞, D14=6.045 to 6.134 mm, and ϕ14=56.413 to 57.041 mm, where R14 is the radius of curvature of the fourteenth lens surface, D14 is the lens surface distance of the fourteenth lens surface, and ϕ14 is the effective clear aperture of the fourteenth lens surface;

the parameters of the fifteenth lens surface comprise R15=41.657 to 48.691 mm, D15=15.231 to 16.098 mm, and ϕ15=49.547 to 50.412 mm, where R15 is the radius of curvature of the fifteenth lens surface, D15 is the lens surface distance of the fifteenth lens surface, and ϕ15 is the effective clear aperture of the fifteenth lens surface;

the parameters of the sixteenth lens surface comprise R16=−163.485 to −158.547 mm, D16=3.987 to 4.021 mm, and ϕ16=49.134 to 50.145 mm, where R16 is the radius of curvature of the sixteenth lens surface, D16 is the lens surface distance of the sixteenth lens surface, and ϕ16 is the effective clear aperture of the sixteenth lens surface;

the parameters of the seventeenth lens surface comprise R17=38.468 to 44.651 mm, D17=10.046 to 10.541 mm, and ϕ17=40.165 to 40.941 mm, where R17 is the radius of curvature of the seventeenth lens surface, D17 is the lens surface distance of the seventeenth lens surface, and ϕ17 is the effective clear aperture of the seventeenth lens surface;

the parameters of the eighteenth lens surface comprise R18=60.134 to 71.347 mm, D18=3.647 to 4.067 mm, and ϕ18=35.145 to 35.654 mm, where R18 is the radius of curvature of the eighteenth lens surface, D18 is the lens surface distance of the eighteenth lens surface, and ϕ18 is the effective clear aperture of the eighteenth lens surface;

the parameters of the nineteenth lens surface comprise R19=26.547 to 32.541 mm, D19=18.034 to 19.654 mm, and ϕ19=29.132 to 29.984 mm, where R19 is the radius of curvature of the nineteenth lens surface, D19 is the lens surface distance of the nineteenth lens surface, and ϕ19 is the effective clear aperture of the nineteenth lens surface;

the parameters of the twentieth lens surface comprise R20=−29.451 to −32.475 mm, D20=2.458 to 4.425 mm, and ϕ20=26.123 to 26.841 mm, where R20 is the radius of curvature of the twentieth lens surface, D20 is the lens surface distance of the twentieth lens surface, and ϕ20 is the effective clear aperture of the twentieth lens surface;

the parameters of the twenty-first lens surface comprise R21=45.374 to 49.324 mm, D21=22.348 to 25.487 mm, and ϕ21=30.546 to 30.987 mm, where R21 is the radius of curvature of the twenty-first lens surface, D21 is the lens surface distance of the twenty-first lens surface, and ϕ21 is the effective clear aperture of the twenty-first lens surface;

the parameters of the twenty-second lens surface comprise R22=−75.341 to −66.874 mm, D22=26.784 to 29.541 mm, and ϕ22=40.568 to 41.025 mm, where R22 is the radius of curvature of the twenty-second lens surface, D22 is the lens surface distance of the twenty-second lens surface, and ϕ22 is the effective clear aperture of the twenty-second lens surface;

the parameters of the twenty-third lens surface comprise R23=−592.657 to −554.654 mm, D23=9.849 to 10.244 mm, and ϕ23=56.154 to 56.987 mm, where R23 is the radius of curvature of the twenty-third lens surface, D23 is the lens surface distance of the twenty-third lens surface, and ϕ23 is the effective clear aperture of the twenty-third lens surface;

the parameters of the twenty-fourth lens surface comprise R24=−89.354 to −85.214 mm, D24=0.178 to 0.211 mm, and ϕ24=58.324 to 59.016 mm, where R24 is the radius of curvature of the twenty-fourth lens surface, D24 is the lens surface distance of the twenty-fourth lens surface, and ϕ24 is the effective clear aperture of the twenty-fourth lens surface;

the parameters of the twenty-fifth lens surface comprise R25=244.534 to 251.541 mm, D25=9.047 to 10.231 mm, and ϕ25=58.314 to 59.154 mm, where R25 is the radius of curvature of the twenty-fifth lens surface, D25 is the lens surface distance of the twenty-fifth lens surface, and ϕ25 is the effective clear aperture of the twenty-fifth lens surface;

the parameters of the twenty-sixth lens surface comprise R26=−141.354 to −136.214 mm, D26=9.475 to 11.347 mm, and ϕ26=57.987 to 59.015 mm, where R26 is the radius of curvature of the twenty-sixth lens surface, D26 is the lens surface distance of the twenty-sixth lens surface, and ϕ26 is the effective clear aperture of the twenty-sixth lens surface;

the parameters of the twenty-seventh lens surface comprise R27=84.394 to 87.398 mm, D27=44.674 to 50.379 mm, and ϕ27=56.124 to 57.621 mm, where R27 is the radius of curvature of the twenty-seventh lens surface, D27 is the lens surface distance of the twenty-seventh lens surface, and ϕ27 is the effective clear aperture of the twenty-seventh lens surface;

the parameters of the twenty-eighth lens surface comprise R28=132.437 to 136.124 mm, D28=10.754 to 11.314 mm, and ϕ28=65.564 to 66.314 mm, where R28 is the radius of curvature of the twenty-eighth lens surface, D28 is the lens surface distance of the twenty-eighth lens surface, and ϕ28 is the effective clear aperture of the twenty-eighth lens surface; and the parameters of the twenty-ninth lens surface comprise R29=−326.154 to −317.645 mm, D29=123.457 to 134.637 mm, and ϕ29=65.324 to 66.654 mm, where R29 is the radius of curvature of the twenty-ninth lens surface, D29 is the lens surface distance of the twenty-ninth lens surface, and ϕ29 is the effective clear aperture of the twenty-ninth lens surface;

wherein the objective lens satisfies: 2×108≤SBP<1.08×109, where the SBP denotes the imaging throughput of the objective lens, SBP=2×(FOV/rxy)2, and the rxy denotes the lateral resolution of the objective lens.

2. The large-field of view, high-resolution broadband objective lens according to claim 1, wherein the cemented lens formed by the first lens and the second lens has a focal length of −29.522 mm, the cemented lens formed by the third lens, the fourth lens and the fifth lens has a focal length of 127.315 mm, the sixth lens has a focal length of 94.234 mm, the cemented lens formed by the seventh lens and the eighth lens has a focal length of −570.237 mm, the cemented lens formed by the ninth lens, the tenth lens and the eleventh lens has a focal length of 121.547 mm, the cemented lens formed by the twelfth lens and the thirteenth lens has a focal length of −226.157 mm, the cemented lens formed by the fourteenth lens and the fifteenth lens has a focal length of −51.524 mm, the sixteenth lens has a focal length of 101.647 mm, the cemented lens formed by the seventeenth lens and the eighteenth lens has a focal length of −437.35 mm, and the nineteenth lens has a focal length of 149.951 mm.

3. The large-field of view, high-resolution broadband objective lens according to claim 2, wherein the first lens has a refractive index/Abbe number of 1.85/30.06, the second lens has a refractive index/Abbe number of 1.693/49.2, the third lens has a refractive index/Abbe number of 1.922/20.882, the fourth lens has a refractive index/Abbe number of 1.816/46.5, the fifth lens has a refractive index/Abbe number of 1.804/46.56, the sixth lens has a refractive index/Abbe number of 1.5/66.05, the seventh lens has a refractive index/Abbe number of 1.64/60.21, the eighth lens has a refractive index/Abbe number of 1.438/94.94, the ninth lens has a refractive index/Abbe number of 1.438/94.94, the tenth lens has a refractive index/Abbe number of 1.755/27.54, the eleventh lens has a refractive index/Abbe number of 1.5/66.05, the twelfth lens has a refractive index/Abbe number of 1.804/46.56, the thirteenth lens has a refractive index/Abbe number of 1.784/25.72, the fourteenth lens has a refractive index/Abbe number of 1.816/46.56, the fifteenth lens has a refractive index/Abbe number of 1.693/49.23, the sixteenth lens has a refractive index/Abbe number of 1.755/27.54, the seventeenth lens has a refractive index/Abbe number of 1.497/81.59, the eighteenth lens has a refractive index/Abbe number of 1.497/81.59, and the nineteenth lens has a refractive index/Abbe number of 1.64/60.214.

4. The large-field of view, high-resolution broadband objective lens according to claim 3, wherein the objective lens satisfies: 0.5≤NA<0.7, the NA denoting the numerical aperture of the objective lens.

5. The large-field of view, high-resolution broadband objective lens according to claim 4, wherein the objective lens satisfies: 6 mm≤FOV<10 mm, the FOV denoting the object-side effective field of view of the objective lens.

6. The large-field of view, high-resolution broadband objective lens according to claim 5, wherein the objective lens satisfies: 400 nm≤Wavelength<1000 nm, the Wavelength denoting the effective working wavelength of the objective lens.

* * * * *